Feb. 12, 1963   H. LIST ET AL   3,077,390
APPARATUS FOR PRODUCING ACETYLENE GAS
Original Filed Nov. 24, 1958
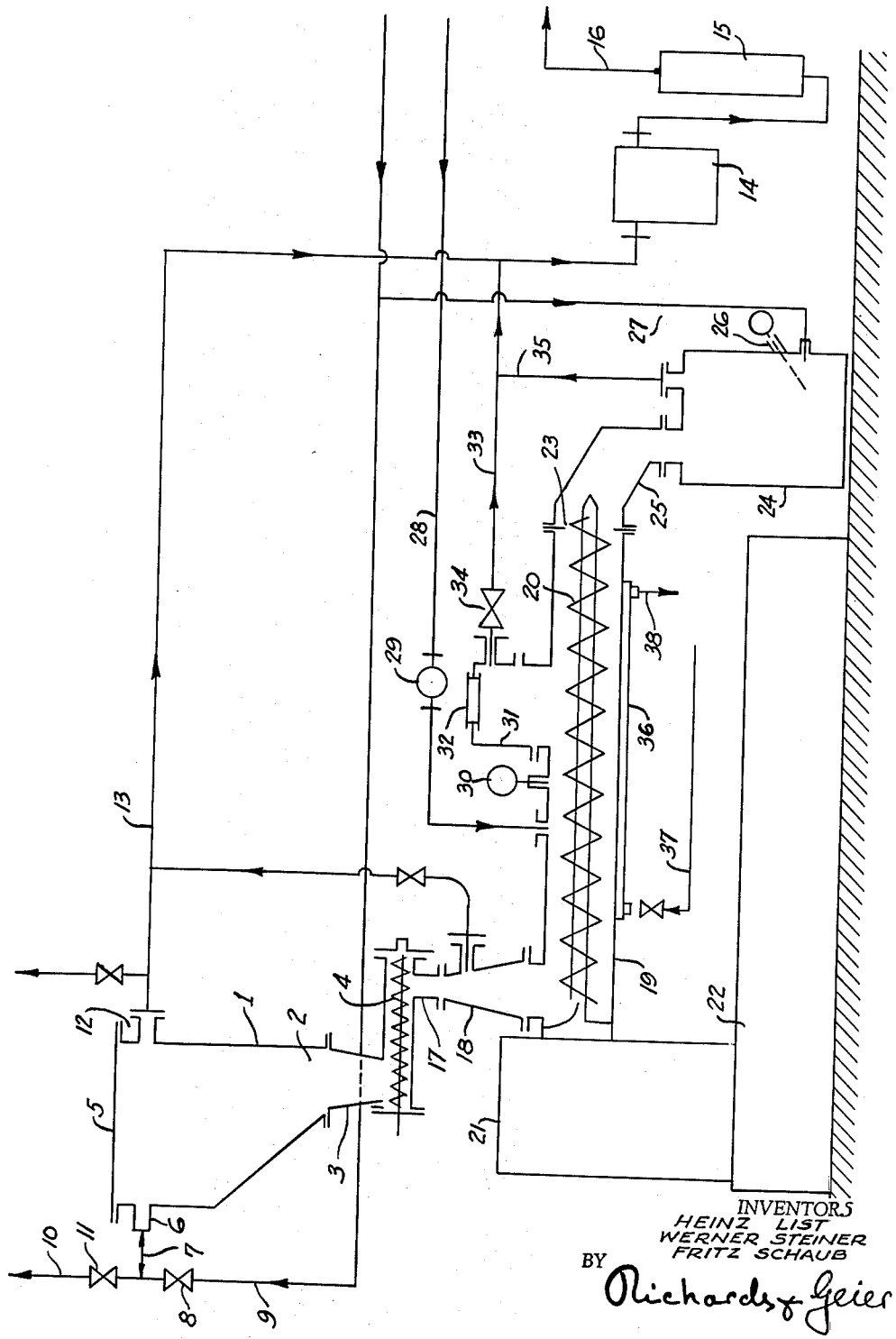
INVENTORS
HEINZ LIST
WERNER STEINER
FRITZ SCHAUB
BY
Richards & Geier
ATTORNEYS United States Patent Office 3,077,390
Patented Feb. 12, 1963

3,077,390
APPARATUS FOR PRODUCING ACETYLENE GAS
Heinz List, St. Jakobstrasse 43, Pratteln, near Basel, Switzerland; Werner Steiner, Bahnhofstrasse 28, Pratteln, near Basel, Switzerland; and Fritz Schaub, Rodriststrasse 1, Basel, Switzerland
Original application Nov. 24, 1958, Ser. No. 775,745. Divided and this application Jan. 8, 1960, Ser. No. 3,220
1 Claim. (Cl. 48—54)

This invention relates to continuous processes of producing acetylene gas by the decomposition of calcium carbide by means of water. This application is a division of application Serial No. 775,745, filed November 24, 1958, now abandoned.

As is known, acetylene is produced by the decomposition of calcium carbide by means of water. The apparatus used for this purposes comprise a container to receive the carbide and a water container from which water flows or drips onto the carbide. In another plant the carbide dips into the water and removes itself automatically as a result of the gas formation. Furthermore so-called carbide-to-water generators have become known in which the carbide is thrown in individual pieces into the water. The disadvantage of all these apparatus and plants consists, primarily in that, due to the large excess of water, slaked lime is formed as a waste product which is difficult to remove and has to be put into special waste pits. This type of waste disposal is costly, is connected with an unbearable smell which involves further losses of acetylene.

It is an object of the present invention to provide a process of and apparatus for producing acetylene gas which has a higher degree of efficiency so that, per kg. of carbide, practically the theoretically possible yield of acetylene gas can be obtained.

According to the invention the continuous process of producing of acetylene gas by the decomposition of calcium carbide by means of water comprises the following steps:

(1) Continuously flowing of calcium carbide in measured rates into and through of a gas production zone, (2) Continuously injecting water in measured quantities into said gas production zone, (3) Mechanically inducing violent and turbulent agitation within said zone to effect contact of said calcium carbide with said injected water thereby causing the gasification and decomposition of said calcium carbide and the formation of acetylene gas and powdered lime by simultaneously destroying of non gasified material cores, (4) Conducting said acetylene gas out of said gas production zone and collecting the same in a tank and separately collecting of said powdered lime.

In this manner the mass is intensively intermixed so that each particle of carbide comes into contact with water. It is no longer necessary to work with an excess of water as only a small quantity of water is now required and it is possible to change over to the method of dry generation. Any remaining plastic lumps which still contain a non-gasified core are destroyed by internal friction during the mechanical agitation. The overcoming of this plastic phase is important for the safety and yield of the process. As a by-product, instead of slaked lime, only powdered lime remains which is easier to transport and can be used further for building purposes or as a fertilizer.

The apparatus for producing of acetylene gas comprises a container having inlet and outlet openings and being intended to receive fine granular calcium carbide, a gas production housing having inlet and outlet openings, means to forwarding said calcium carbide continuously and in measured rates from said container in said gas production housing, means for continuously injecting water in measured quantities into said gas production housing, means for mechanically inducing violent and turbulent agitation within said housing to effect contact of said calcium carbide with said injected water thereby causing the gasification and decomposition of said calcium carbide and the formation of acetylene gas and powdered lime, first conducting means for the removing of said acetylene gas from said gas production housing and second conducting means for the removing of said powdered lime from said gas production housing. Said means for mechanically inducing violent and turbulent agitation comprises a mixing and kneading apparatus arranged in said gas producing housing. The mixing and kneading apparatus consists of a feed screw, which carries out a rotating and a reciprocating motion, so that during the kneading process, spaces for the egress of the gases always remain open. The plastic phase in the kneading process is thus overcome.

It is furthermore desirable for certain fast reacting types of carbide to keep the speed of gas production low since thus the cooling, i.e. the removal of the heat of reaction is facilitated. It was found that the speed of gas production is proportional to the calcium content and can be reduced by admixing a fine granular material with a large surface, e.g. powdered lime, with the carbide.

An embodiment by way of example of apparatus according to the invention is diagrammatically shown in the accompanying drawing.

The apparatus comprises a container 1 which is intended to receive fine granular carbide. The container 1 shown is in the form of a hopper and has an outlet pipe 2 which is connected to the inlet 3 of a metering feed screw 4. The container 1 is closed by a lid 5 and has, in its upper portion, a connection 6 for a gas conduit 7 through which an inert gas can be introduced into the container 1. The gas conduit 7 is connected with a gas container (not shown) via a shut off valve 8 and a conduit 9, whilst a conduit 10 which extends to atmosphere is connected via a valve 11, to the same conduit 7. 12 indicates a further connection to the container 1, which is connected to a conduit 13 which leads via a meter 14 e.g. a gas meter, to a scrubber 15. A conduit 16 leads from this purifier 15 to the point of use of the gas.

The outlet 17 of feed screw 4 is connected to an inlet 18 of a feed screw housing 19 in which a mixing and kneading screw 20 is disposed and which is capable of reciprocal movement. The drive for the screw 20 is disposed in a housing 21 which rests on a support 22. Feed screw 20 in operation moves relative to fixed teeth (not shown) which ensure that spaces for the egress of gas are formed in the mass. The discharge end 23 of the screw housing 19 is connected by a pipe 25 to a container 24 in which the powdered lime is collected. The container 24 is fitted with a thermometer 26 as well as with a conduit 27 which is connected to the gas conduit 9.

A water pipe 28 which is connected via a metering water pump 29 with a water container (not shown) is connected to the feed screw housing 19. 30 indicates a thermometer for the screw housing 19 which has a dome like portion 31 having a gauge glass 32 and an outlet pipe 33. This pipe 33 can be closed by a valve 34 and is connected to the acetylene conduit 13. Furthermore, a branch conduit 35 leads from the container 24 to pipe 33.

For cooling of the material mixed in the screw housing 19, the latter has a jacket 36 which is connected to a cooling water inlet 37 and outlet 38.

Before putting the plant into operation, the reaction chambers are filled with an inert gas, e.g. nitrogen, through the conduit 9 in order to drive out the oxygen from the reaction chambers. Carbide is fed from the container 1 by the metering feed screw 4, to the feed screw housing 19 in which screw 20 carries out a simultaneous reciprocating and rotating movement as a result of which the grains of carbide are vigorously intermixed. Simultaneously the metering water pump 29 feeds water into the housing 19 through the conduit 28. The water is injected in accurately metered quantities distributed over the length of the screw, so that it just suffices for the formation of the gas. The acetylene gas formed collects in the dome shaped structure 31 and is led off through pipe 33. Simultaneously cooling water circulates in the jacket 36. Some acetylene gas will also be formed in the container 1 which will then be led off through conduit 13. The powdered lime is collected in the container 24 and any acetylene gas which may form here is led to conduit 33 through pipe 35. The conduit 27 serves for the washing out of the container 24, prior to the start of the reaction process. Since the reaction is carried out without excess of water the calcium hydroxide does not precipitate in the form of slaked lime but powdered lime remains which can be used again e.g. as a fertilizer. If desired, powdered lime can be admixed with the carbide for reducing the speed of gas production. Tests carried out have shown that the yield of acetylene is substantially increased.

We claim:

An apparatus for producing acetylene gas by decomposing calcium carbide with water, said apparatus comprising, in combination, a container for granular calcium carbide, said container having inlet and outlet openings, a metering feed screw having an inlet connected with said outlet opening, and an outlet, a feed screw housing having an inlet opening connected with said outlet of the metering feed screw, whereby said calcium carbide is forwarded in measured rates into said feed screw housing, said housing having a dome-like portion, a single mixing and kneading screw located in said feed screw housing, a drive connected with said single mixing and kneading screw for simultaneously rotating and reciprocating said mixing and kneading screw, a metering water pump connected with said feed screw housing for continuously injecting water in measured quantities into said feed screw housing, whereby said calicum carbide is contacted by the injected water, thereby causing gasification and decomposition of calcium carbide and formation of acetylene gas and powdered lime, the gasified acetylene collecting in said dome-like portion, a pipe connected with said dome-like portion of the feed screw housing for removing said acetylene gas, a gas meter connected with said pipe, another pipe connected with said container and the first-mentioned pipe, a scrubber connected with said gas meter, another container connected with said feed screw housing for removing said powedered lime, and an inert gas conduit connected with said two containers.

References Cited in the file of this patent
UNITED STATES PATENTS

| 2,278,521 | Kojola | Apr. 7, 1942 |
| 2,290,915 | Mesinger | July 28, 1942 |
| 2,731,247 | Hurdy | Jan. 17, 1956 |